(12) United States Patent
Berkemeier et al.

(10) Patent No.: US 9,316,188 B2
(45) Date of Patent: Apr. 19, 2016

(54) DIRECT-INJECTION INTERNAL COMBUSTION ENGINE WITH OUTWARDLY OPENING INJECTION NOZZLE, AND METHOD FOR OPERATING AN INTERNAL COMBUSTION ENGINE OF SAID TYPE

(71) Applicant: Ford Global Technologies, LLC, Dearborn, MI (US)

(72) Inventors: Oliver Berkemeier, Bergisch Gladbach (DE); Thomas Lorenz, Cologne (DE); Helmut Hans Ruhland, Eschweiler (DE); Stefan Quiring, Leverkusen (DE); Maziar Khosravi, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 319 days.

(21) Appl. No.: 13/924,329

(22) Filed: Jun. 21, 2013

(65) Prior Publication Data
US 2014/0069371 A1    Mar. 13, 2014

(30) Foreign Application Priority Data
Sep. 12, 2012 (DE) .......................... 10 2012 216 141

(51) Int. Cl.
| | | |
|---|---|---|
| *F02B 3/00* | (2006.01) | |
| *F02M 61/00* | (2006.01) | |
| *F02B 5/00* | (2006.01) | |
| *F02B 19/14* | (2006.01) | |
| *F02M 39/00* | (2006.01) | |
| *F02M 61/08* | (2006.01) | |
| *F02B 23/10* | (2006.01) | |
| *F02B 75/12* | (2006.01) | |

(52) U.S. Cl.
CPC .............. *F02M 39/00* (2013.01); *F02B 23/101* (2013.01); *F02B 23/104* (2013.01); *F02M 61/08* (2013.01); *F02B 2075/125* (2013.01); *Y02T 10/123* (2013.01); *Y02T 10/125* (2013.01)

(58) Field of Classification Search
CPC .. F02B 3/06; F02B 2075/125; F02B 2275/14; F02M 61/08; F02M 61/20; B05B 1/323; F16K 15/063; F16K 17/06; F04B 39/013
USPC ............................ 123/294; 239/453; 137/542
See application file for complete search history.

(56) References Cited

U.S. PATENT DOCUMENTS

| 4,082,224 A * | 4/1978 | Mangus ........................ 239/453 |
| 4,408,722 A * | 10/1983 | Frelund ........................ 239/453 |
| 6,746,001 B1 * | 6/2004 | Sherikar ......................... 261/62 |
| 2005/0150978 A1 * | 7/2005 | Kaden et al. ................... 239/453 |

FOREIGN PATENT DOCUMENTS

WO       2004061288 A2      7/2004

* cited by examiner

*Primary Examiner* — Lindsay Low
*Assistant Examiner* — Syed O Hasan
(74) *Attorney, Agent, or Firm* — Julia Voutyras; Alleman Hall McCoy Russell & Tuttle LLP (57) ABSTRACT

A direct-injection engine having a cylinder in which a combustion chamber is jointly formed by a piston crown of a piston, which is movable along the longitudinal axis of the cylinder, and a cylinder head, and an injection nozzle, which is arranged in the cylinder head on the opposite side of the piston crown eccentrically, spaced apart from the longitudinal axis of the cylinder, for the direct injection of fuel, which injection nozzle has a nozzle needle movable in a nozzle body, wherein the needle in the open position of the nozzle is moved into the combustion chamber, opening up an annular gap arranged between the nozzle body and needle.

19 Claims, 4 Drawing Sheets

DIRECT-INJECTION INTERNAL COMBUSTION ENGINE WITH OUTWARDLY OPENING INJECTION NOZZLE, AND METHOD FOR OPERATING AN INTERNAL COMBUSTION ENGINE OF SAID TYPE

CROSS REFERENCE TO RELATED APPLICATIONS

The present application claims priority to German Patent Application No. 102012216141.4, filed on Sep. 12, 2012, the entire contents of which are hereby incorporated by reference for all purposes.

BACKGROUND

Within the context of this disclosure, the expression "engine" encompasses internal combustion engines and, in particular, applied-ignition Otto-cycle engines but also hybrid engines, that is to say engines which are operated using a hybrid combustion process, and diesel engines.

In the development of engines, it is generally sought to minimize fuel consumption and reduce exhaust emissions.

The traditional Otto-cycle engine operates with a homogeneous air-fuel mixture, wherein setting the desired power is achieved by quantity regulation and varying the charge of the combustion chamber. By adjusting a throttle flap which is provided in the intake tract, the pressure of the inducted air downstream of the throttle flap can be reduced to a greater or lesser extent. For a constant combustion chamber volume, it is possible in this way for the air mass to be set by means of the pressure of the inducted air. However, quantity regulation via a throttle flap has thermodynamic disadvantages in the part-load range due to throttling losses. Thus, in Otto-cycle engines particularly, minimizing fuel consumption can be challenging.

One approach for dethrottling the Otto-cycle engine working process that has been implemented in the development of hybrid combustion processes is based on the transfer of technical features of the traditional diesel engine process. These features may include air compression, inhomogeneous charge mixtures, auto-ignition, and quality regulation. The low fuel consumption of the diesel engine may result largely from quality regulation, in which the load is controlled by means of the injected fuel quantity.

The injection of fuel directly into the combustion chamber of a cylinder is therefore considered to be a suitable method for noticeably reducing fuel consumption, even in Otto-cycle engines. The dethrottling of the engine may be achieved by quality regulation being used within certain limits.

To initiate the applied ignition in a direct-injection Otto-cycle engine, the engine may be equipped with an ignition device, such as an ignition plug. Thus, one task during the structural design of the combustion chamber is providing a coordinated arrangement of the injection nozzle and ignition device in the combustion chamber, which is often difficult due to the very limited space availability in the cylinder head of the engine.

For these reasons, the injection nozzle is often arranged in the cylinder head eccentrically and spaced apart from the longitudinal axis of the cylinder, as described in the present disclosure. According to an embodiment, an injection nozzle which opens outwardly may be used for the injection of the fuel and is opened by virtue of the nozzle needle being moved into the combustion chamber. The open nozzle has an annular gap between the nozzle body and needle, through which fuel is introduced into the combustion chamber.

Such an arrangement of the injection nozzle has a disadvantageous effect on the mixture formation in the combustion chamber. In particular, there may be a conflict between the eccentric arrangement of the nozzle and the introduction of a fuel cloud with uniform mass distribution into the combustion chamber via the annular gap. That is to say, the asymmetrical arrangement of the nozzle in the combustion chamber may conflict with the formation of a uniform and symmetrical fuel cloud for efficient combustion and decreased emissions. Furthermore, the injection nozzle is often also inclined with respect to the longitudinal axis of the cylinder, which may further intensify the described disadvantages.

The fuel cloud of homogeneous form and uniform mass distribution in interaction with the eccentric, possibly inclined installation position of the nozzle, contributes to a fuel distribution in the combustion chamber that has an adverse effect on the combustion and the formation of pollutants, in particular the emissions of unburned hydrocarbons and soot.

Thus the inventors sought to provide a direct-injection engine wherein the above disadvantages resulting from the eccentric installation position of the nozzle art are reduced or eliminated. They found that this could be achieved in part in an embodiment wherein a direct-injection engine has at least one cylinder in which a combustion chamber is jointly formed by a piston crown of a piston, which is movable along the longitudinal axis of the cylinder, a cylinder head, and an injection nozzle, which is arranged in the cylinder head on the opposite side of the piston crown eccentrically and spaced apart from the longitudinal axis of the cylinder. For the direct injection of fuel, the injection nozzle may have a nozzle needle which is movable in a nozzle body which serves as a nozzle housing, wherein the needle, when transferred into the open position of the nozzle by being moved into the combustion chamber, opens up an annular gap arranged between the nozzle body and needle. One or more guide elements that influence the fuel flow are provided on a surface of the nozzle.

Therefore, by redirecting some of the fuel flow inside the injector via the guide elements, a non-uniform inflow condition may result and thus cause uneven flow distribution at the nozzle exit. The injector may therefore be tuned for off-center injection placement and aligned for deflection of air movements.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION

DETAILED DESCRIPTION

Providing a coordinated arrangement of the injection nozzle and ignition device in a combustion chamber is often difficult due to the very limited space available in the engine head. Space may be conserved by arranging the injection nozzle in the cylinder head eccentrically and spaced apart from the longitudinal axis of the cylinder.

According to the embodiment, an injection nozzle used for the injection of the fuel may open outwardly by virtue of the nozzle needle being moved into the combustion chamber. The open nozzle may have an annular gap between the nozzle body and needle, through which fuel is introduced into the combustion chamber.

Such an arrangement of the injection nozzle has a disadvantageous effect on the mixture formation in the combustion chamber. In particular, there may be a conflict between the eccentric arrangement of the nozzle and the creation of a fuel cloud with uniform mass distribution being introduced into the combustion chamber via the annular gap. That is to say, the asymmetrical arrangement of the nozzle in the combustion chamber may conflict with the formation of a uniform and symmetrical fuel cloud for efficient combustion and decreased emissions. Further, the injection nozzle may also be inclined with respect to the longitudinal axis of the cylinder, which may further intensify the described disadvantages.

The fuel cloud of homogeneous form and uniform mass distribution in combination with the eccentric and possibly inclined installation position of the nozzle, contributes to a fuel distribution in the combustion chamber that may have an adverse effect on the combustion and the formation of pollutants, in particular the emissions of unburned hydrocarbons and soot.

Thus the inventors sought to provide direct-injection engine wherein the above disadvantages resulting from the eccentric installation position of the nozzle are reduced or eliminated. They found that this could be achieved in an embodiment wherein a direct-injection engine has at least one cylinder in which a combustion chamber is jointly formed by a piston crown of a piston, which is movable along the longitudinal axis of the cylinder, a cylinder head, and an injection nozzle, which is arranged in the cylinder head on the opposite side of the piston crown eccentrically and spaced apart from the longitudinal axis of the cylinder.

For the direct injection of fuel, the injection nozzle has a nozzle needle which is movable in a nozzle body which serves as a nozzle housing, wherein the needle, when transferred into the open position of the nozzle by being moved into the combustion chamber, opens up an annular gap arranged between the nozzle body and needle. The needle may have one or more elements to influence the fuel flow on a surface of the nozzle that faces toward the fuel. The guide element may thus redirect some of the fuel flow inside the injector to create a non-uniform inflow condition and uneven flow distribution at nozzle exit. The injector may therefore be tuned for off-center injection placement and may be further tuned to align for desired air flow deflection.

Figure 1:
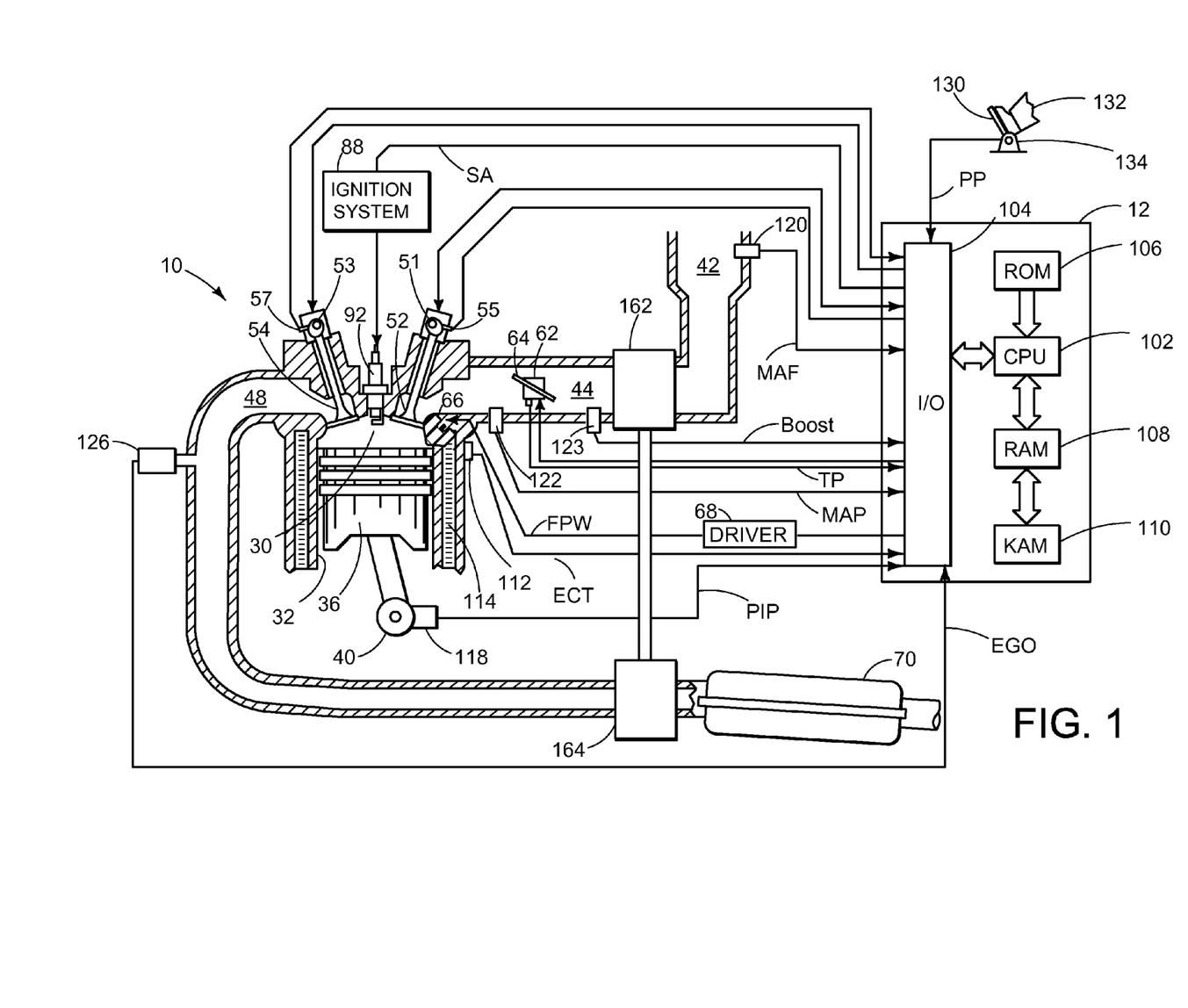
FIG. 1 shows an example engine embodiment.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Cylinder (i.e., combustion chamber) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Cylinder 30 may receive intake air from intake manifold 44 via intake passage 42 and may exhaust combustion gases via exhaust passage 48. Intake manifold 44 and exhaust passage 48 can selectively communicate with cylinder 30 via respective intake valve 52 and exhaust valve 54. In some embodiments, cylinder 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to cylinder 30 for injecting fuel directly therein in proportion to the pulse width of signal FPW received from controller 12 via electronic driver 68. In this manner, fuel injector 66 provides what is known as direct injection of fuel into cylinder 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, cylinder 30 may alternatively or additionally include a fuel injector arranged in intake passage 42 in a configuration that provides what is known as port injection of fuel into the intake port upstream of cylinder 30. Fuel injector 66 may include an injection nozzle such as that described in herein.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to cylinder 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to cylinder 30 via spark plug 92 in response to spark advance signal SA from controller 12, under select operating modes. Though spark ignition components are shown, in some embodiments, cylinder 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Engine 10 may further include a compression device such as a turbocharger or supercharger including at least a compressor 162 arranged along intake manifold 44. For a turbocharger, compressor 162 may be at least partially driven by a turbine 164 (e.g. via a shaft) arranged along exhaust passage 48. One or more of a wastegate and a compressor bypass valve may also be included to control flow through the turbine and compressor. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. Further, a sensor 123 may be disposed in intake manifold 44 for providing a BOOST signal to controller 12.

Figure 4:
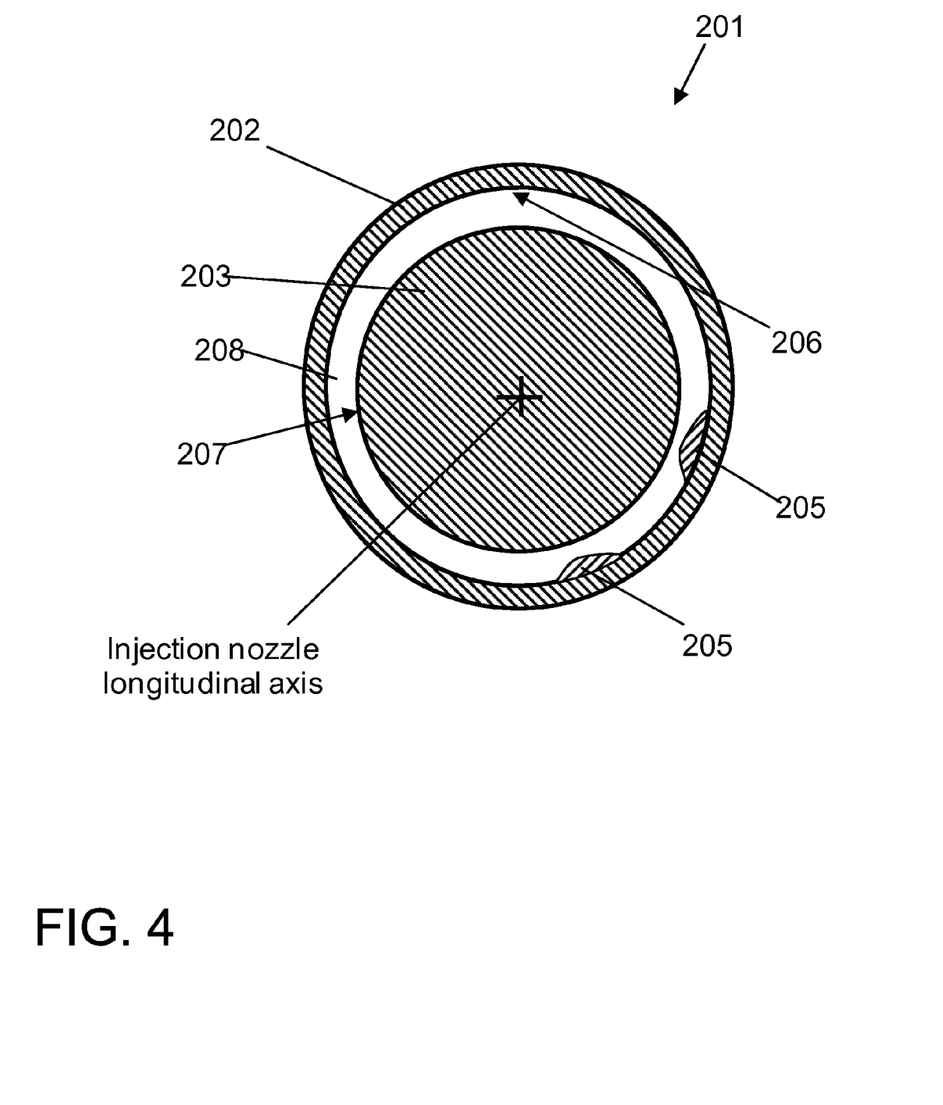
FIG. 4 shows an alternate embodiment of an injection nozzle.

Controller 12 is shown in FIG. 4 as a microcomputer, including microprocessor unit 102, input/output ports 104, an electronic storage medium for executable programs and calibration values shown as read-only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses each revolution of the crankshaft.

Storage medium read-only memory 106 can be programmed with computer readable data representing instructions executable by processor 102 for performing the methods described below as well as other variants that are anticipated but not specifically listed.

Figure 2:
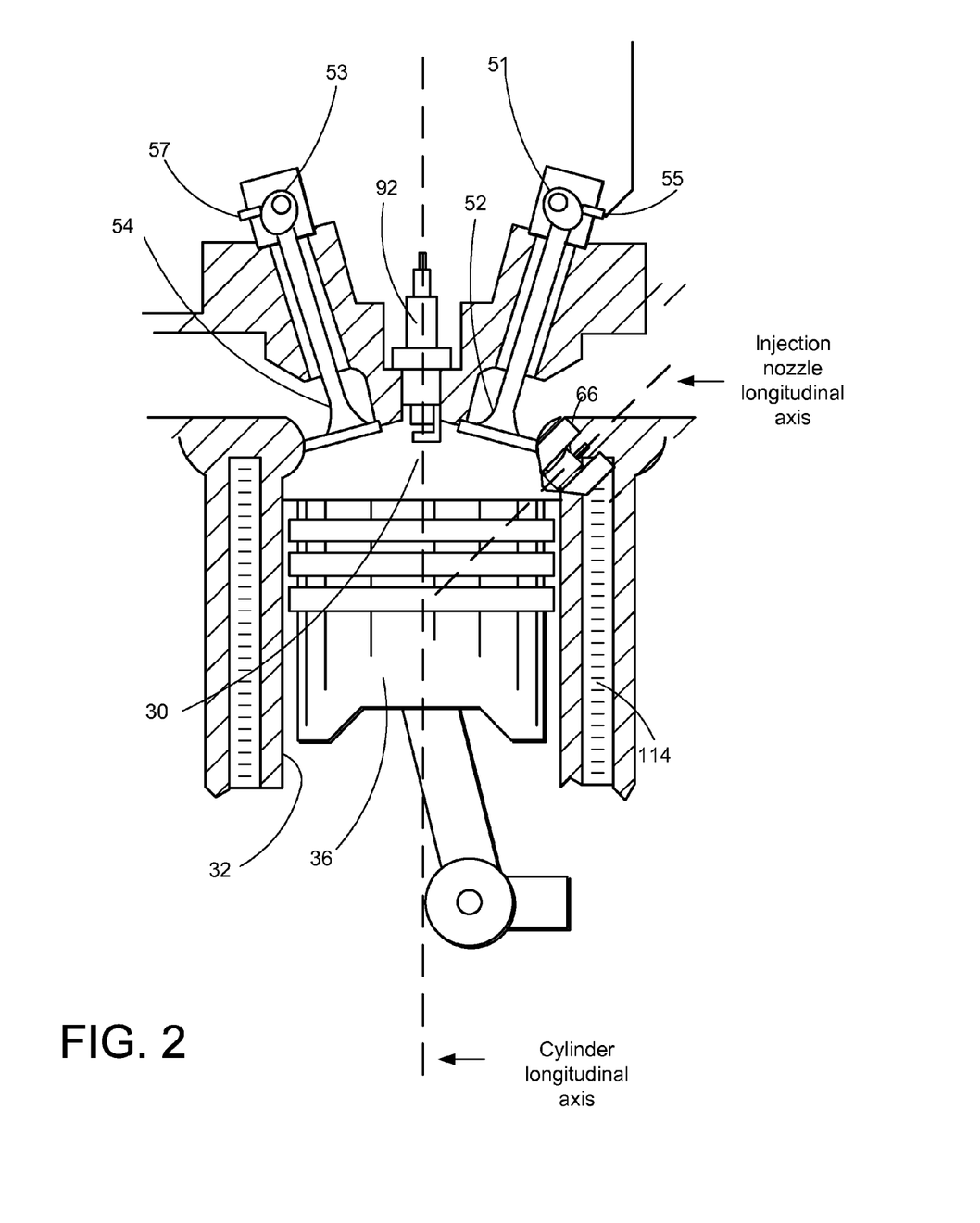
FIG. 2 shows an example embodiment of an engine cylinder.

A portion of engine 10 is shown in FIG. 2, specifically fuel injector 66, cylinder 30 and piston 36. The cylinder here is shown aligned along a cylinder longitudinal axis that may run through the length of the cylinder and piston. An example injection nozzle longitudinal axis is also shown in FIG. 2. Here the injection nozzle longitudinal axis is inclined so that it does not run parallel to the cylinder longitudinal axis. The injection nozzle longitudinal axis may run parallel to the injection needle or the center of the annular gap as discussed herein.

In some embodiments the injection nozzle longitudinal axis may be parallel to the cylinder longitudinal axis and may be spaced way from the center of the cylinder. In other embodiments, the injection nozzle longitudinal axis and the cylinder longitudinal axis may have an angular displacement between 0 and 180 degrees.

Figure 3A:
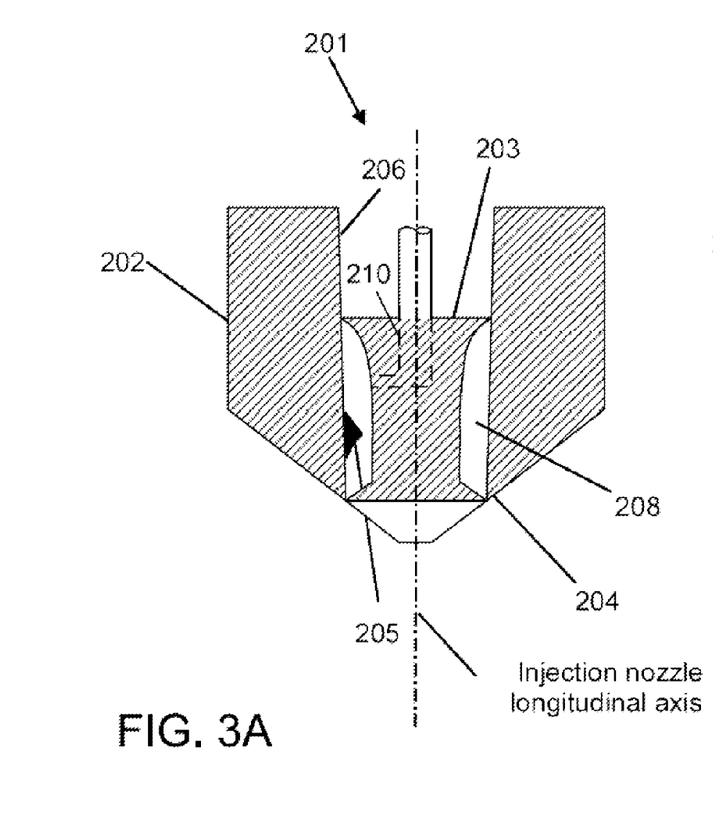
FIG. 3A shows an example embodiment of an injection nozzle in a closed position.

FIG. 3A schematically shows an example embodiment of the injection nozzle 201 in a side view and in a closed position. A fuel injector may include injection nozzle 201 for injecting fuel into a combustion cylinder. The injection nozzle 201 may directly inject fuel into the combustion chamber and have a nozzle body 202 which functions as a housing and nozzle needle 203 mounted in a movable manner. A fuel injector and nozzle located therein may be fluidically coupled to a fuel line via a fuel passage 210 they may run through the nozzle needle 203 and have one or more outlets into annular gap 204. Nozzle body 202 may additionally or alternatively have fuel passages coupled to a fuel line with an outlet into annular gap 204. Fuel delivered to annular gap 204 from one or more fuel passages may be pressurized. A fuel line may be connected to one or more fuel tanks where fuel may be periodically replenished. In some embodiments a single engine cylinder may have multiple fuel injectors that may be coupled to the same or different fuel sources.

Figure 3B:
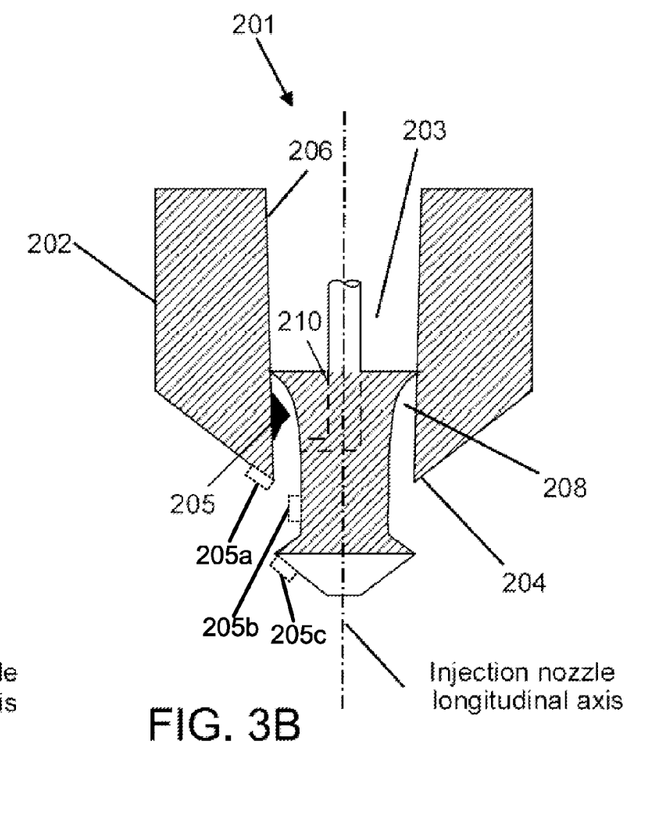
FIG. 3B shows an example embodiment of an injection nozzle in an open position.

As a result of the movement of the nozzle needle 203 along the longitudinal axis of the nozzle 201, the nozzle 201 is opened. As shown in FIG. 3B, an annular gap 204 between the nozzle body 202 and the nozzle needle 203 is opened up for the introduction of fuel into the combustion chamber. The annular gap 204 may be fully encompassed by the nozzle body 202 and the needle 203 when in the closed position such that it can be filled entirely or partially with fuel. In the open position the needle 203 may protrude from the nozzle body 202 into the combustion chamber thus exposing the annular gap 204 and fluidically coupling the annular gap 204 to the combustion chamber. Thus the needle may be linearly mobile along the nozzle's longitudinal axis.

In the interior of the nozzle 201, on an inner surface 206, which faces toward the fuel and the needle 203, of the nozzle body 202, there is arranged a guide element 205 for influencing the fuel flow conducted through the nozzle 201 via the duct 208. The guide element 205 may be of undulating form.

Non-uniform, or varying injection conditions along the annular gap of the nozzle may result from the injection nozzle being provided with at least one guide element. As a result, unequal amounts of fuel emerge from the nozzle and pass into the combustion chamber at points along the annular gap. Furthermore, the fuel emerging from the annular gap may not have uniform momentum. As a result, the fuel cloud introduced into the combustion chamber may have a non-uniform mass distribution. Guiding fuel flow asymmetrically, with respect to the longitudinal axis of the nozzle may be aided by guide elements obstructing the fuel flow path asymmetrically either within the annular gap 204 or proximate to the annular gap 204. Obstructions may be undulated or spherical and may be located within a fuel flow path.

The non-uniform mass distribution in the fuel cloud emerging from the annular gap and the fuel cloud which is of inhomogeneous form in combination with the eccentrically arranged nozzle, leads to a fuel distribution in the combustion chamber which may enable the charge air situated in the combustion chamber to be more efficiently utilized. Advantages may thus be attained with regard to the combustion and thus emissions.

Turning now to FIG. 4, another embodiment of the injection nozzle 201 is depicted in a cross section perpendicular to the longitudinal axis of the nozzle 201. It should be noted that the like reference numbers have been used for like components.

In contrast to the embodiment illustrated in FIG. 3, the guide elements 205 arranged on the inner surface 206 of the nozzle body 202 are of spherical form. As in the embodiment illustrated in FIG. 3, the guide elements 205 face toward the fuel and the inner surface 207 of the needle 203.

Non-uniform injection conditions along the annular gap of the nozzle may result from one or more partial guide elements within the injection nozzle. As a result, unequal amounts of fuel may emerge from the nozzle and pass into the combustion chamber at points along the annular gap. Further, the fuel emerging from the annular gap may not have uniform momentum. As a result, the fuel cloud introduced into the combustion chamber has a non-uniform mass distribution as opposed to a traditional substantially symmetrical distribution.

The non-uniform mass distribution in the inhomogeneous fuel cloud emerging from the annular gap in combination with the eccentrically arranged nozzle contributes to an advantageous fuel distribution for combustion. Advantages may thus be attained with regard to both combustion and emissions.

Further embodiments may have multiple fuel injectors arranged on a single engine cylinder, one or more of which may be eccentrically arranged and spaced away from the cylinder longitudinal axis and/or inclined. Advantageous embodiments may arrange two nozzles on opposite sides of the cylinder or may equally space a number of nozzles around the diameter of a combustion chamber to achieve a more symmetrical fuel cloud.

Embodiments of the engine may be advantageous in which the at least one guide element 205 is arranged on the surface of the nozzle body 202. The nozzle body 202 may have, on its inner side and on its outer side facing toward the combustion chamber, an adequately large surface area for the arrangement of the at least one guide element 205. In particular, the nozzle body 202 may have a larger surface area than the nozzle needle 203, for which reason the nozzle body 202 may be particularly suitable for the provision and support of a guide element. In comparison to the nozzle needle 203, the nozzle body 202 may also be the larger component, and thus more suited for the accommodation of guide elements 205. With regard to the arrangement of the guide element on the nozzle body 202, it may also be advantageous for the nozzle body 202, in contrast to the needle 203, to be static and not displaced.

Embodiments in which one or more guide element is arranged on the surface of the nozzle body 202 may be advantageous in which the at least one guide element 205 is arranged in the interior of the nozzle 201 on the inner surface 206 of the nozzle body 202. Here, embodiments may be further advantageous in which the guide element 205 is arranged in the interior of the nozzle and faces toward the nozzle needle 203.

If a guide element 205 is arranged in the interior of the nozzle 201, the guide element may influence the fuel flow in the interior of the nozzle, before it emerges from the nozzle 201. With a guide element 205 arranged in such a way, it is possible for the amount of fuel emerging at a particular point of the annular gap to be influenced, whereas a guide element 205 arranged outside the nozzle 201 may influence the direction of the fuel that has already emerged from the nozzle 201 and thus influences the distribution in the combustion chamber.

Nevertheless, embodiments may also be advantageous in which a guide element 205a is arranged on the outer surface, which faces toward the combustion chamber, of the nozzle body 202.

Embodiments may also include at least one guide element 205 arranged on the surface of the nozzle needle 203. Here, embodiments may be advantageous in which a guide element 205b is arranged in the interior of the nozzle 201 on a surface of the nozzle needle 203 that faces toward the inner surface 206 of the nozzle body 202 for reasons that have been stated above in conjunction with the arrangement on an inner surface 206 of the nozzle body 202. Embodiments may also be advantageous in which at least one guide element 205c is arranged on the outer surface, which faces toward the combustion chamber, of the nozzle needle 203. Other embodiments may have the at least one guide element arranged outside the annular gap.

The annular gap of the outwardly opening injection nozzle, as used according to an embodiment, may have very small dimensions and manufacturing tolerances. Nozzle needle 203 situated in the rest position or closed position of the nozzle 201 may securely close the nozzle 201. The introduction of fuel via the annular gap when the nozzle is closed may reliably prevented leakage of fuel when closed off. This may cause manufacturing complications if a guide element is arranged within the annular gap. It is therefore advantageous in some embodiments for the at least one guide element to be arranged outside the annular gap.

Embodiments of the engine may be advantageous in which the at least one guide element is of undulating form, wherein the undulating form is preferably oriented in the direction of the main flow direction of the fuel.

Embodiments of the engine may also be advantageous in which the at least one guide element is of spherical form or when the injection nozzle is arranged so as to be inclined with respect to the longitudinal axis of the cylinder.

An inclined installation position of the nozzle may serve to orientate the eccentrically arranged nozzle in the direction of an ignition device or in the direction of the center of the combustion chamber. In this respect, the inclined arrangement of the nozzle may also assist in a uniform distribution of the fuel in the combustion chamber.

Some embodiments of the engine may have applied ignition. As stated in the introduction, the direct injection of fuel into the combustion chamber is a suitable measure for reducing fuel consumption in auto-ignition Otto-cycle engines, wherein the imperatively provided ignition device necessitates the eccentric arrangement of the nozzle. Embodiments of the engine may however also be advantageous in which the combustion of the fuel/air mixture is initiated by means of auto-ignition.

In some advantageous embodiments, the injection nozzle may be a piezoelectric or magnetically controlled injection nozzle.

In some embodiments the piston crown of the piston is provided with a piston depression. Fuel may have a limited window of time for injection to achieve desirable mixture preparation in the combustion chamber. Thus the mixing of air and fuel, the preparation of the fuel within the context of preliminary reactions including evaporation, and the ignition of the prepared mixture may happen quickly so as to achieve ignition within an appropriate crank angle interval. A piston depression arranged in the piston crown and may be omegashaped, may be advantageous for distributing the fuel throughout the entire combustion chamber to achieve fast mixing of the injected fuel with the compressed charge air.

In this way, fast mixing may take place despite a limited opening angle of the conically formed injection cloud to achieve optimum air utilization. A piston depression may consequently assist the mixture preparation and the homogenization of the mixture.

In engines whose pistons are provided with a piston depression, embodiments may be advantageous in which the piston depression is formed centrally in the piston crown rather than eccentrically to the injection nozzle, such that the longitudinal axis of the depression coincides with the longitudinal axis of the piston. This is because, during the compression, the piston depression has a significant influence on the movement of the cylinder's fresh charge in the combustion chamber. Further, if the fuel flow during the injection is influenced in such a way that non-uniform injection conditions are generated along the annular gap by a guide element on the injection nozzle, the fuel cloud introduced into the combustion chamber may have a non-uniform mass distribution.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine system, comprising: a combustion chamber; a cylinder; a cylinder head with an injection nozzle arranged in the cylinder head on an opposite side of a piston crown eccentrically and spaced apart from a longitudinal axis of the cylinder, for direct injection of fuel; a nozzle needle within the injection nozzle, the nozzle needle movable in a nozzle body which serves as a nozzle housing, the nozzle needle having top and bottom ends which contact the nozzle body when the injection nozzle is in a closed position; wherein an annular gap exists between the top and bottom ends of the nozzle needle and the nozzle body in the closed position of the injection nozzle, and wherein the nozzle needle is moved into the combustion chamber in an open position of the injection nozzle; and a guide element which projects into and influences a fuel flow, the guide element arranged on an inner surface of the nozzle body which faces toward the fuel, wherein the guide element is arranged within the annular gap in the closed position of the injection nozzle, wherein the injection nozzle is fluidically coupled to a fuel line via a fuel passage which runs through the nozzle needle and has one or more outlets into the annular gap.

2. The engine system of claim 1, wherein the guide element faces toward the nozzle needle.

3. The engine system of claim 1, wherein the guide element is a first guide element, and wherein the engine system further comprises a second guide element arranged on an outer surface of the nozzle body, the second guide element facing toward the combustion chamber.

4. The engine system of claim 3, further comprising a third guide element arranged on a surface of the nozzle needle, the third guide element arranged within the annular gap in the closed position of the injection nozzle.

5. The engine system of claim 4, wherein the surface of the nozzle needle on which the third guide element faces is toward the inner surface of the nozzle body or toward the combustion chamber.

6. The engine system of claim 1, wherein the guide element is a first guide element, and wherein the engine system further comprises a second guide element arranged outside the annular gap.

7. The engine system of claim 1, wherein the guide element has an undulating form or a spherical form.

8. The engine system of claim 1, wherein the injection nozzle is inclined with respect to the longitudinal axis of the cylinder.

9. The engine system of claim 1, wherein the engine has applied ignition.

10. The engine system of claim 1, wherein the piston crown includes a piston depression.

11. An engine method, comprising: filling an annular gap of an injection nozzle at least partially with fuel, the injection nozzle comprising a nozzle body and a nozzle needle, the nozzle needle having top and bottom ends which contact the nozzle body when the injection nozzle is in a closed position, wherein the annular gap is formed between the top and bottom ends of the nozzle needle and the nozzle body in the closed position of the injection nozzle; injecting fuel via the nozzle needle into a combustion chamber in an open position of the injection nozzle; with a guide element, guiding a fuel flow into the combustion chamber asymmetrically through the annular gap, wherein the guide element is arranged within and projects into the annular gap in the closed position of the injection nozzle: and introducing a fuel cloud into the combustion chamber, the fuel cloud having a non-uniform mass distribution, wherein the injection nozzle is fluidically coupled to a fuel line via a fuel passage which runs through the nozzle needle and has one or more outlets into the annular gap.

12. The engine method of claim 11, wherein the guide element obstructs a path of fuel flow.

13. The engine method of claim 11, wherein the guide element is undulated or spherical.

14. The engine method of claim 13, wherein the guide element is a first guide element, the method further comprising guiding the fuel flow with a second guide element located outside the annular gap in the closed position of the injection nozzle.

15. The engine method of claim 11, further comprising injecting fuel from a position on a cylinder head eccentrically spaced from a longitudinal axis of the combustion chamber.

16. The engine method of claim 11, further comprising applying ignition in the combustion chamber.

17. An engine system comprising: a cylinder including a combustion chamber, a piston, and a piston crown; a fuel injector mounted to or within the cylinder and coupled to a fuel line, the fuel injector including a nozzle, the nozzle including a nozzle body encompassing a nozzle needle linearly mobile along a longitudinal axis of the nozzle, where top and bottom ends of the nozzle needle contact the nozzle body when the nozzle is in a closed position; an annular gap formed between and fully enclosed by the nozzle body and the top and bottom ends of the nozzle needle, when the nozzle is in the closed position, the annular gap fluidically coupled to the combustion chamber and not fully enclosed by the nozzle body and the top and bottom ends of the nozzle needle when the nozzle is in an open position; and a guide element arranged on an inner surface of the nozzle body within the annular gap and projecting asymmetrically into a fuel flow path, wherein the injection nozzle is fluidically coupled to a fuel line via a fuel passage which runs through the nozzle needle and has one or more outlets into the annular gap.

18. The engine system of claim 17, wherein the nozzle is eccentrically spaced away from a longitudinal axis of the cylinder.

19. The engine system of claim 17, wherein the nozzle is parallel to a longitudinal axis of the cylinder, or the nozzle is inclined with respect to the longitudinal axis of the cylinder such that the nozzle needle is more downward in the open position than in the closed position.

* * * * *